United States Patent [19]

Rabii

[11] Patent Number: 5,153,742
[45] Date of Patent: Oct. 6, 1992

[54] DROP-OUT CORRECTION INHIBITOR FOR PREVENTING CORRUPTION OF SPATIALLY NON-CORRELATED DATA

[75] Inventor: Khosro M. Rabii, Arlington Heights, Ill.

[73] Assignee: Zenith Electronics Corporation, Glenview, Ill.

[21] Appl. No.: 738,022

[22] Filed: Jul. 30, 1991

[51] Int. Cl.⁵ .............................................. H04N 5/76
[52] U.S. Cl. ..................................... 358/336; 360/38.1
[58] Field of Search ............... 358/336, 314, 335, 320, 358/337; 360/36.1, 38.1

[56] References Cited

U.S. PATENT DOCUMENTS

| | | | |
|---|---|---|---|
| 4,409,626 | 10/1983 | Ferguson et al. | 358/336 |
| 4,729,041 | 3/1988 | Kuroda | 358/336 |
| 4,737,862 | 4/1988 | Koga | 358/314 |
| 4,831,443 | 5/1989 | Heinz | 358/147 |
| 5,057,934 | 10/1991 | Yun et al. | 358/314 |

Primary Examiner—Robert L. Richardson
Assistant Examiner—Huy Nguyen

[57] ABSTRACT

A drop-out correction circuit for use in a VCR includes a generator for developing a gating signal identifying selected horizontal lines of a video signal containing spatially non-correlated encoded data. A control signal developed in response to a drop-out detection signal and the gating signal is applied to a drop-out corrector for providing a drop-out corrected signal at an output terminal except during the occurrence of said selected lines. A noise cancellation circuit operative except during the selected horizontal lines may be coupled to the output of the drop-out corrector.

10 Claims, 1 Drawing Sheet

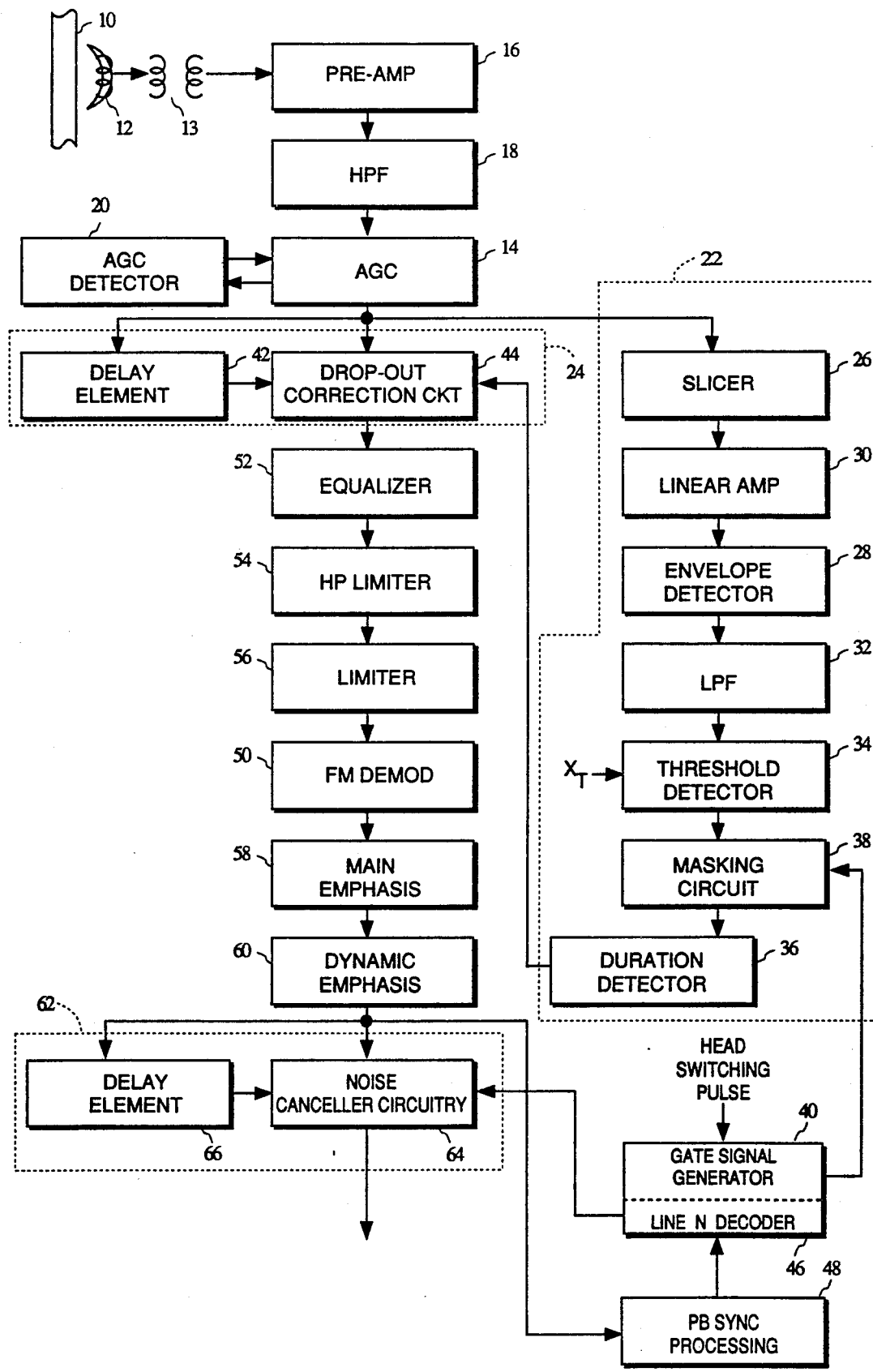

DROP-OUT CORRECTION INHIBITOR FOR PREVENTING CORRUPTION OF SPATIALLY NON-CORRELATED DATA

BACKGROUND OF THE INVENTION

The present invention relates generally to video cassette recorders (VCR's) and particularly concerns the operation of such circuits in the presence of encoded data such as teletext and closed-caption data.

The phenomenon of drop-out during VCR playback is well known in the art. In conventional consumer VCR's, video signals are recorded on a magnetic tape and later played back in the form of frequency modulated RF signals. Drop-out occurs when the level of the RF signal falls below a given threshold value. This can be caused by various factors including imperfections in the tape (ie. when the magnetic particles "drop-out" from the tape), dust adhering to the tape and improper tension of the tape during playback.

The use of special circuits to compensate for such drop-outs is well known in the art. In particular, prior art drop-out compensation circuits typically operate in reliance on the correlated nature of video signals by substituting a video patch for the drop-out, the patch being derived from a portion of the video signal nearby the drop-out. For example, the patch may be derived from a prior segment of the same video line on which the drop-out occurred or may be derived by averaging the video comprising the line on which the drop-out occurred with the video occurring on the previous line. In any case, drop-out compensation is effected on the assumption that the typical video signal is highly correlated in a spatial sense.

This assumption, however, is not valid for all components of a video signal and, in particular, is not valid in the case of data encoded in the video signal. Such data, for example closed-caption data encoded on line 21 and teletext data encoded on lines 17-19 of the vertical blanking interval (VBI) of an NTSC television signal, is not spatially correlated so that the use of a conventional drop-out compensation circuit in connection therewith will corrupt the data beyond the point of recognition. A similar problem occurs in noise cancellation circuits used in many VCR's, since such circuits also operate on the presumption of correlated video.

It is therefore a basic object of the present invention to provide an improved VCR play-back circuit.

It is a more specific object of the invention to provide an improved VCR which operates in a manner that minimizes the corruption of encoded data during playback.

BRIEF DESCRIPTION OF THE DRAWINGS

These and other objects and advantages of the invention will be apparent upon reading the following description in conjunction with the drawing, the single figure of which comprises a partial block diagram of a VCR operating in accordance with the invention.

DESCRIPTION OF THE PREFERRED EMBODIMENT

The circuit illustrated in the drawing depicts an embodiment of the invention in which particular forms of VCR drop-out compensation and noise cancellation circuits are operated for accommodating, for example, closed-caption data encoded on VBI line 21 of an NTSC television signal. It is to be understood, however, that this embodiment is not intended to be of a limiting nature and that the principles of the invention are equally applicable to other forms of drop-out compensation and noise cancellation circuits and to data encoded in other lines of the television signal.

Referring now to the drawing, a VCR includes a magnetic tape 10 and a playback head 12 disposed in close proximity thereto. During playback, head 12 develops a frequency modulated RF video signal which is applied to an AGC circuit 14 through a rotary transformer 13, a pre-amplifier 16 and a high-pass filter 18. AGC circuit 14, which operates in association with an AGC detector 20, supplies a gain controlled frequency modulated RF video signal to the input of a drop-out detection circuit 22 and to the input of a drop-out correction circuit 24.

Drop-out detection circuit 22, which is largely conventional in design, includes an input slicer 26 which slices the applied frequency modulated RF video signal and couples it to an envelope detector 28 through a linear amplifier 30. The output of envelope detector 28, which represents the level of the carrier signal read from tape 10, is then filtered by a low-pass filter 32 and applied to a threshold detector 34. Threshold detector 34 also receives a drop-out threshold reference signal $X_T$ and rier level is greater than reference $X_T$ and a second output control signal when the detected carrier level is less than reference $X_T$. The output of threshold detector 34, which is therefore indicative of the existence or nonexistence of a drop-out condition, is applied to a duration detector 36 through a masking circuit 38. Masking circuit 38 comprises a switching circuit operated in response to a gating signal from a gate signal generator 40. Conventionally, generator 40 is operated in response to a head switching pulse which typically occurs during the last line of each VBI of the video signal for continuously generating the gating signal except during head switching. Thus, the control signals developed by threshold detector 34 are continuously applied to duration detector 36 by masking circuit 38 except during head switching. Duration detector 36 develops a first logic output whenever the second control signal generated by threshold detector 34 and supplied by masking circuit 38 has a duration exceeding a predetermined drop-out interval and otherwise develops a second logic output. Thus, except during head switching, a first logic signal is applied to drop-out correction circuit 24 in response to a drop-out condition exceeding a predetermined time interval and otherwise a second logic signal is applied to the drop-out correction circuit.

Drop-out correction circuit 24 comprises a one line delay element 42 and a drop-out corrector 44. In the non-drop-out correction mode, i.e. in response to the second logic signal from detector 36, the FM video signal developed at the output of AGC circuit 14 is coupled directly through drop-out corrector 44 in unmodified form. However, in the drop-out correction mode, i.e. in response to the first logic signal from detector 36, a drop-out corrected signal is provided by drop-out corrector 44 by, for example, summing the direct and delayed video signals and dividing the summed signal to provide an output representing the average of the current and preceding video lines. This technique provides effective drop-out correction for spatially correlated video but would severely corrupt non-correlated encoded data during playback. Thus, according to one aspect of the invention, drop-out detection circuit 22 is operated for inhibiting the generation of the first logic signal during selected lines of the video signal thereby forcing drop-out correction circuit 24 into its non-correction mode for the duration of such lines. As a result, any spatially non-correlated data encoded in these lines will not be corrupted by the operation of drop-out corrector 44.

More specifically, in accordance with the present invention, gate signal generator 40 is modified to include a decoder 46 which is responsive to horizontal and vertical synch signals supplied by a playback synch processor 48 for identifying selected horizontal lines of the video signal. The selected lines may comprise horizontal line 21, which includes encoded closed, caption data, and/or horizontal lines 17-19 which include encoded teletext data, of the VBI. The line identification signal developed by decoder 46 is preferably multiplexed with the head switching pulse in generator 40 to provide a composite gating signal for application to masking circuit 38 of drop-out detection circuit 22. The control signals developed by threshold detector 34 are therefore now de-coupled from duration detector 36 during both head switching and during the selected lines identified by decoder 46. As a consequence, drop-out correction is also inhibited during the selected horizontal lines thereby preventing the corruption of data encoded therein.

The output of drop-out corrector 44 is applied to an FM demodulator 50 through a conventional equalizer circuit 52, a high-pass limiter 54 and a limiter 56. The demodulated baseband video signal is then emphasized by a main emphasis circuit 58 and a dynamic emphasis circuit 60. The output of dynamic emphasis circuit 60 is applied to synch processor 48 and to a noise cancellation circuit 62. Noise cancellation circuit 62 comprises a noise canceller 64 having a first input directly receiving the output of dynamic emphasis circuit 60 and a second input receiving the output of circuit 60 delayed one line by a delay element 66. Noise canceller 64 is conventionally continuously operable for combining the signals applied to its two inputs for providing a noise-cancelled output signal for further processing by the VCR. As in the case of drop-out corrector 44, noise canceller 64 is effective for canceling noise characterizing spatially correlated video, but would corrupt spatially non-correlated data processed thereby. Accordingly, according to the present invention, the line identification signal developed by decoder 46 is applied to noise canceller 64 to inhibit is operation during the selected encoded lines of the video signal. In its inhibited mode, noise canceller 64 simply couples the direct video signal applied to its first input to its output thereby preventing the corruption of data encoded in the selected horizontal lines.

It is recognized that numerous changes and modifications in the described embodiment of the invention will be apparent to those skilled in the art without departing from its true spirit and scope. The invention is therefore to be limited only as defined in the claims.

That which is claimed is:

1. An improved drop-out correction circuit comprising:
    means for developing a video signal comprising a plurality of repetitive horizontal scanning lines, one or more of said horizontal scanning lines comprising spatially non-correlated data;
    means for generating a control signal identifying the occurrence of a drop-out portion of said video signal, including means inhibiting the generation of said control signal during said one of or more horizontal lines comprising spatially non-correlated data; and
    drop-out correction means responsive to the absence of said control signal for coupling said video signal to an output terminal and responsive to said control signal for generating and coupling a drop-out corrected video signal to said output terminal, said correction means including means for combining two closely spaced portions of said video signal for deriving said drop-out corrected signal.

2. The improved drop-out correction circuit of claim 1 wherein said inhibiting means comprises means for developing horizontal and vertical timing signals and decoder means responsive to said horizontal and vertical timing signals for generating a gating signal identifying said one or more horizontal lines.

3. The improved drop-out correction circuit of claim 2 wherein said non-correllated data comprises closed caption encoded data.

4. The improved drop-out correction circuit of claim 2 wherein said video signal coupled to said output terminal includes a noise component and including noise cancellation means responsive to said decoder means for canceling said noise component except during said one or more horizontal lines.

5. An improved drop-out correction circuit comprising:
    means for developing a video signal comprising a plurality of repetitive horizontal scanning lines;
    means for generating a control signal identifying the occurrence of a drop-out portion of said video signal, including means inhibiting the generation of said control signal at least during selected ones of said horizontal lines containing spatially non-correlated encoded data;
    drop-out correction means operable in response to the absence of said control signal for coupling said video signal to an output terminal and operable in response to said control signal for coupling a drop-out corrected video signal to said output terminal, said correction means including means for combining at least two closely spaced ones of said horizontal lines for deriving said drop-out corrected signal; and
    noise cancellation means coupled to said inhibiting means and operable for canceling noise characterizing the video signal coupled to said output terminal except during said selected horizontal lines.

6. The improved drop-out correction circuit of claim 5 wherein said inhibiting means comprises means for developing horizontal and vertical timing signals and decoder means responsive to said horizontal and vertical timing signals for applying said control signal to said drop-out correction means during all but said selected horizontal lines.

7. The improved drop-out correction circuit of claim 6 wherein said non-correllated encoded data comprises closed caption encoded data.

8. A method of correcting video drop-outs comprising:
    developing an input video signal comprising a plurality of repetitive horizontal scanning lines, one or more of said horizontal scanning lines comprising spatially non-correlated data;
    generating a control signal identifying a drop-out portion of said input video signal except during the occurrence of said one or more horizontal lines; and developing a drop-out corrected video signal at an output terminal in response to said control signal and developing said input video signal at said output terminal in response to the absence of said control signal.

9. The method of claim 8 including:

developing a drop-out detection signal identifying said drop-out portion of said input video signal;

developing a gating signal identifying said one or more horizontal lines; and gating said drop-out detection signal in response to said gating signal for generating said control signal.

10. The method of claim 9 including canceling noise characterizing the video signal developed at said output terminal during all of said horizontal lines except said one or more lines.

* * * * *